United States Patent
Vinson et al.

(10) Patent No.: US 10,464,690 B2
(45) Date of Patent: Nov. 5, 2019

(54) METHOD FOR MONITORING THE AGEING OF A LANDING GEAR OF AN AIRCRAFT

(71) Applicants: SAFRAN ELECTRONICS & DEFENSE, Boulogne-Billancourt (FR); SAFRAN LANDING SYSTEMS, Velizy Villacoublay (FR)

(72) Inventors: Garance Vinson, Velizy Villacoublay (FR); Nicolas Fanton, Boulogne-Billancourt (FR); Pierre-Jean Tine, Boulogne-Billancourt (FR); Sully Vitry, Boulogne-Billancourt (FR); Christophe Loustaudaudine, Boulogne-Billancourt (FR)

(73) Assignees: SAFRAN ELECTRONICS & DEFENSE, Boulogne-Billancourt (FR); SAFRAN LANDING SYSTEMS, Velizy Villacoublay (FR)

( * ) Notice: Subject to any disclaimer, the term of this patent is extended or adjusted under 35 U.S.C. 154(b) by 0 days.

(21) Appl. No.: 16/064,855

(22) PCT Filed: Dec. 20, 2016

(86) PCT No.: PCT/EP2016/082013
§ 371 (c)(1),
(2) Date: Jun. 21, 2018

(87) PCT Pub. No.: WO2017/108848
PCT Pub. Date: Jun. 29, 2017

(65) Prior Publication Data
US 2019/0002120 A1   Jan. 3, 2019

(30) Foreign Application Priority Data
Dec. 21, 2015 (FR) .................. 15 62913

(51) Int. Cl.
*B64F 5/60* (2017.01)
*G07C 5/00* (2006.01)
(Continued)

(52) U.S. Cl.
CPC ............... *B64D 45/00* (2013.01); *B64F 5/60* (2017.01); *G07C 5/008* (2013.01); *G07C 5/085* (2013.01);
(Continued)

(58) Field of Classification Search
CPC ........... B64D 45/00; B64F 5/60; G07C 5/008
See application file for complete search history.

(56) References Cited

U.S. PATENT DOCUMENTS 8,042,765 B1   10/2011   Nance
2006/0106582 A1   5/2006   Schmidt
(Continued)

FOREIGN PATENT DOCUMENTS

WO   2008/110836 A1   9/2008

OTHER PUBLICATIONS

International Search Report for PCT/EP2016/082013, dated Mar. 15, 2017.
(Continued)

*Primary Examiner* — Aaron L Troost
(74) *Attorney, Agent, or Firm* — Sughrue Mion, PLLC (57) ABSTRACT

A method is provided. The method includes, after a landing of an aircraft, detecting by sensors the position of the landing gear at a first sampling frequency, while the position of the landing gear is detected as vertical. After detection of a horizontal position of the landing gear, detecting by the sensors the position of the landing gear at least at a second sampling frequency, while the position of the landing gear is detected as horizontal. After detection of a vertical position of the landing gear, acquiring by said sensors physical
(Continued)

parameters relating to the ageing of the landing gear, and detecting a landing of the aircraft at a third sampling frequency until a predetermined period has expired. The third frequency is greater than the second frequency, which is greater than the first frequency. Measurements relating to the ageing are stored as a function of the measured physical parameters.

13 Claims, 6 Drawing Sheets

(51) Int. Cl.
  *G07C 5/08* (2006.01)
  *H04W 4/80* (2018.01)
  *B64D 45/00* (2006.01)
(52) U.S. Cl.
  CPC ............... *B64D 2045/008* (2013.01); *B64D 2045/0085* (2013.01); *H04W 4/80* (2018.02)

(56) References Cited

U.S. PATENT DOCUMENTS

| | | | |
|---|---|---|---|
| 2009/0210173 A1 | 8/2009 | Arms et al. | |
| 2010/0121504 A1* | 5/2010 | Jones | B64D 45/00 701/16 |
| 2012/0095703 A1* | 4/2012 | Zakrzewski | B64C 25/00 702/42 |
| 2013/0030614 A1 | 1/2013 | Ding et al. | |
| 2017/0363486 A1* | 12/2017 | Okulov | B81B 7/00 |

OTHER PUBLICATIONS

Trummer et al. "Verification methodology for battery lifetime requirements of higher class UHF RFID tags." RFID, 2009 IEEE International Conference on. IEEE, 2009.
International Search Report, dated Jun. 29, 2017, in International Application No. PCT/EP2016/082013.
French Preliminary Search Report, dated Aug. 15, 2016, in French Patent Application No. 1562913.

* cited by examiner

METHOD FOR MONITORING THE AGEING OF A LANDING GEAR OF AN AIRCRAFT

GENERAL TECHNICAL FIELD

The invention concerns the field of monitoring the ageing of an aircraft.

Its object is more particularly a method for monitoring the ageing of a landing gear of an aircraft with the aid of an autonomous measuring device.

PRIOR ART

Aircraft landing gear components are subject to considerable mechanical stresses during a landing. Such stresses lead to an ageing that may go as far as a rupture or an inability of these components to perform their function during a landing. The lives of the aircraft's passengers may then be jeopardized if such ageing is not monitored so as to trigger a maintenance operation before it becomes critical.

In a first approach it is possible to count a number of landings made by an aircraft since its commissioning and to trigger a preventive maintenance operation when this number of landings has exceeded a limit beyond which it becomes impossible to ensure that the aircraft's landing gears will continue to perform their function correctly. Nevertheless, such a method of monitoring has the failing of counting only the landings of the aircraft and not those of its landing gears. These numbers may be different because of a common practice of reusing landing gears on an aircraft from another aircraft, e.g. after its retirement. Failing a precise traceability of the fate of each landing gear, the number of landings, and therefore the ageing, of a landing gear risks being underestimated. Furthermore, such a method is unable to determine the exact impact of each landing on the components of a landing gear. Such an impact may indeed be very variable according to the hardness of the landing.

In order to more accurately reflect the impact of each landing on the components of a landing gear, existing monitoring methods provide for installing sensors on the landing gear or gears of an aircraft and for measuring physical parameters of the landings undergone by these gears, such as the accelerations undergone by the components of the gears during landings.

Such methods, however, have the major drawback of requiring the connection of these sensors onto the aircraft's avionics system. These sensors require indeed to be electrically powered, and a processing system is required for processing and storing the signals coming from these sensors. At least one communication interface of the aircraft must also be called upon in order to extract these measurements from the aircraft's system for transferring them into the computer system of the company responsible for maintaining the aircraft. In addition to its drawback in terms of spatial requirement, such a connection of these sensors onto the aircraft's avionics system requires extensive, and therefore expensive, certification of such components in order to prove the absence of any impact on the correct operation of the rest of the aircraft's computer system.

There is therefore a need for an autonomous method of monitoring the ageing of a landing gear of an aircraft allowing detailed tracking of the stresses undergone by the latter during successive landings, not requiring to be connected to the aircraft's avionics system and not requiring any human intervention for the period of several years between two major maintenance operations.

DESCRIPTION OF THE INVENTION

According to a first aspect, the present invention relates to a method for monitoring the ageing of a landing gear of an aircraft implemented by an autonomous measuring device mounted on said landing gear and comprising:
  at least one sensor configured for measuring physical parameters relating to the ageing of the landing gear and at least one sensor configured for detecting the position of the landing gear and the landing of the aircraft,
  a storage memory for storing measurements relating to the ageing of the landing gear according to said measured physical parameters,
    said monitoring method comprising:
      after a landing of the aircraft, a stand-by step ("STAND-BY") comprising detection with the aid of said sensors of the position of the landing gear at a first sampling frequency as long as the position of the landing gear is detected as vertical,
      after detection of a horizontal position of the landing gear, a sleep step ("SLEEP") comprising detection with the aid of said sensors of the position of the landing gear at least at a second sampling frequency, as long as the position of the landing gear is detected as horizontal,
      after detection of a vertical position of the landing gear, a measuring step ("AWAKE") comprising acquisition with the aid of said sensors of physical parameters relating to the ageing of the landing gear and detection of a landing of the aircraft until a predetermined period has expired after a landing has been detected,
said monitoring method further comprising a storage ("STORAGE") in said storage memory of measurements relating to the ageing of the landing gear according to said measured physical parameters.

During the measuring step ("AWAKE"), the acquisition and detection are implemented at a third sampling frequency, this frequency being greater than said second sampling frequency or frequencies, said second frequency or frequencies being greater than said first frequency/frequencies. This third frequency is adapted to an observation of vibratory phenomena by the sensors during the measuring step ("AWAKE").

Notably, the physical parameters relating to the ageing of the landing gear may be acquired for different peaks of successive stresses and/or multiple successive vibratory sequences.

Also, the acquisitions of physical parameters may be converted into number of ageing cycles, the numbers of ageing cycles thus obtained being summed, the sum of these cycles being compared to a threshold for possible triggering of an alert.

One such method makes it possible to monitor the ageing of the landing gear of an aircraft in a detailed way while minimizing the power consumption of the measuring device in order to allow battery operation over a long period.

The measuring step ("AWAKE") of the method according to the first aspect may further comprise detection at the third sampling frequency of the position of the landing gear and said measuring step may be implemented until the detection of a horizontal position of the landing gear.

This makes it possible to interrupt the measuring step when this is not followed in the end by a landing, e.g. in the event of postponement of the landing or erroneous opening of the landing gear.

The physical parameters relating to the ageing of the landing gear may comprise the static and dynamic strains of structural parts of the aircraft, the accelerations of components of the landing gear, the pressures and temperatures of the aircraft's tires, the pressures and temperatures of the aircraft's shock struts, the travel of the aircraft's shock strut.

The ageing of the landing gear may thus be estimated in a detailed way by taking into account multiple ageing processes, taking place on different parts of the landing gear.

Said sensors may detect the position of the landing gear and the landing of the aircraft from measurements of the accelerations undergone by the landing gear.

The position of the landing gear and the landing of the aircraft may thus be detected with the aid of one and the same sensor, improving the compactness of the device.

The measurements relating to the ageing of the landing gear may comprise a number of violent "hard" landings, and mechanical stresses undergone by the gear due to runway excursions or bounces, during which the acceleration of the landing gear has exceeded a predetermined threshold, on at least one of the three landing axes during at least one past landing as well as a number of landings.

Such measurements make it possible to effectively characterize the ageing of the landing gear in a summary way, without requiring the storage of all the measured physical parameters.

The method according to the first aspect may further comprise the implementation of the stand-by step when the duration of implementation of the measuring step reaches a predetermined maximum duration.

This makes it possible to interrupt an unnecessary stand-by step and to avoid a waste of the resources of the device.

The method according to the first aspect may comprise a hibernation step ("OFF") during which the device detects the reception of an activation command at a fourth sampling frequency less than said first frequency and the stand-by step may be implemented following the detection of said command.

The power consumption of the measuring device may thus be kept to the minimum for a long period of storage, while allowing remote activation without a mechanical interface, in order to ensure the seal tightness of the device.

Said measurements relating to the ageing of the landing gear may be obtained by comparing said measured physical parameters to a predetermined threshold or to a standard profile.

A summary datum characterizing the ageing of the gear may thus be obtained from a larger quantity of measured physical parameters.

Said measuring device further comprising a communication interface, said method according to the first aspect may comprise a step of transmitting said measurements relating to the ageing of the landing gear stored in said storage memory to an external terminal.

The measurements may thus be transmitted to an external device, e.g. for making use of them as part of a maintenance process.

Said measuring device may further transmit said measurements relating to the ageing of the landing gear only during the stand-by step.

Any unauthorized access to the data during the other steps, i.e. mainly during the aircraft's flight, may thus be prevented.

According to a second aspect, the invention concerns a computer program product comprising code instructions for executing the method according to the first aspect, when this program is executed by a processor.

According to a third aspect, the invention concerns an autonomous measuring device for being mounted on said landing gear and comprising:

at least one sensor configured for measuring physical parameters relating to the ageing of the landing gear and at least one sensor configured for detecting the position of the landing gear and the landing of the aircraft.

a storage memory for storing measurements relating to the ageing of the landing gear according to said measured physical parameters, said device being configured, once mounted on the landing gear, for implementing said steps of the monitoring method according to the first aspect.

Such sensors may be from among or a combination of gyroscopic sensors, accelerometers, stress gages, temperature, pressure sensors, strain gages, light intensity sensors, magnetic sensors, linear or rotary movement sensors.

According to a fourth aspect, the invention concerns a monitoring system comprising the autonomous measuring device according to the second aspect and an external terminal, said measuring device further comprising a communication interface configured for transmitting to said external terminal the measurements relating to the ageing of the landing gear stored in said storage memory.

Such a communication interface may only be activated during the stand-by step ("STAND-BY").

Such a communication interface may furthermore be an RFID, NFC interface, or a cellular network interface for connected objects.

Such computer program products, devices and systems offer the same advantages as those mentioned for the method according to the first aspect.

DESCRIPTION OF THE FIGURES

Other features and advantages will appear on reading the following description of an embodiment. This description will be given with reference to the appended drawings in which.

DETAILED DESCRIPTION

Figure 1:
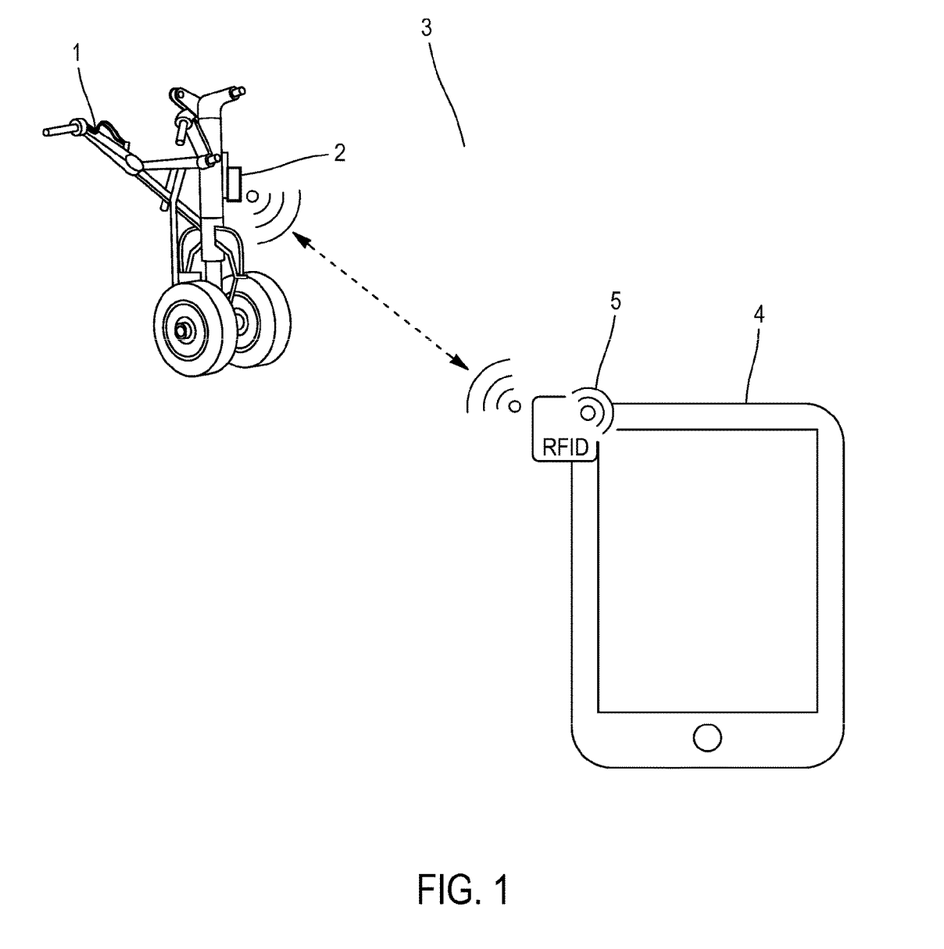
FIG. 1 illustrates a landing gear monitoring system according to an embodiment of the invention.

An implementation of the invention concerns a method for monitoring the ageing of a landing gear 1 of an aircraft. This method is implemented by an autonomous measuring device 2 configured for being mounted on the landing gear 1 of the aircraft and comprised in a landing gear monitoring system 3, as represented in FIG. 1.

The method provides for monitoring the ageing of the landing gear of the aircraft 1 so as to effectively characterize such ageing by instrumenting the gear with the aid of the single autonomous measuring device 2 designed for acquiring various physical parameters during the landings made by the landing gear.

Figure 2:
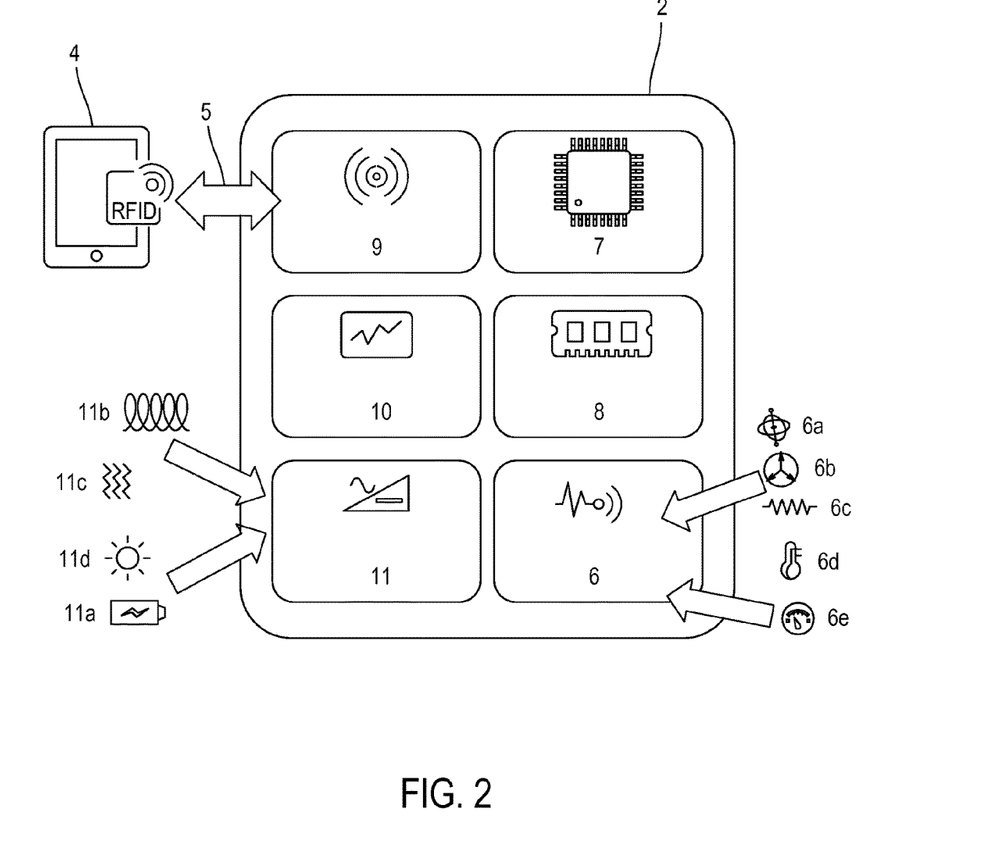
FIG. 2 illustrates an autonomous measuring device according to an embodiment of the invention.

For this, the autonomous measuring device 2 may comprise at least one sensor 6 as represented in FIG. 2. The autonomous measuring device may thus comprise at least one sensor configured for measuring physical parameters relating to the ageing of the landing gear and at least one sensor configured for detecting the position of the landing gear and the landing of the aircraft. Thus, according to a non-exhaustive list, such sensors may be sensors from among or a combination of gyroscopic sensors 6a for measuring the three components of the angular velocity vector (roll, pitch and yaw speeds), accelerometers 6b for measuring the linear accelerations of the landing gear in three orthogonal directions, stress gages 6c, temperature 6d and atmospheric pressure 6e sensors, strain gages for measuring the static and dynamic strains of structural parts of the aircraft, light intensity sensors, magnetic sensors, linear or rotary movement sensors, etc. Such sensors may also be dedicated to the monitoring of particular components of the gear. Such sensors may then, for example, measure the pressure and temperature of the tires or of the shock struts of the gear, or even the travel of the shock struts. The measurement of such parameters relating directly to the landing gear makes it possible to fully reconstruct the stresses of the gear and thus to characterize its ageing.

The autonomous measuring device may also comprise a processor or microprocessor 7. Such a processor or microprocessor 7 may be a processor of the x-86 or RISC type, a controller or microcontroller, a DSP, an integrated circuit such as an ASIC or programmable such as an FPGA, or a combination of such elements. This processor or microprocessor 7 is configured for controlling the operation of the various components of the autonomous measuring device and for processing the physical parameters measured by the sensors thereof according to specific processing.

The autonomous measuring device may also comprise a storage memory 8, such as a rewritable nonvolatile memory like a flash memory or an EEPROM memory, for storing measurements relating to the ageing of the landing gear according to said measured physical parameters.

Such measurements may comprise the physical parameters measured by the sensors during one or more landings and/or the result of specific processing by the processor 7 of the measured physical parameters. Such specific processing may comprise comparing said measured physical parameters to a predetermined threshold or to a standard profile. In this case, the predetermined thresholds and the standard profiles may be previously stored in the storage memory 8. Such measurements relating to the ageing of the landing gear may then comprise the number of violent, "hard landings" and mechanical stresses undergone by the gear due to runway excursions or bounces, during which the acceleration of the landing gear has exceeded a predetermined threshold, on at least one of the three landing axes in at least one past landing, and the number of landings undergone by the landing gear, or even a maximum acceleration on at least one of the three landing axes in at least one past landing. These measurements may thus make it possible to quantify the impact of the landings, to detect and quantify the impact of the hard landings, to quantify the impact of possible runway excursions during or following a landing, and thus to estimate the fatigue state of the landing gear.

The autonomous measuring device may also comprise a power manager 10 managing the modes of electrical consumption of the components of the measuring device 2 and a power source 11 for electrically powering these components. Such a power source may comprise one or more elements from among a battery 11a, an induction 11b, vibratory 11c, solar 11d power converter, or a power converter by temperature gradient. The autonomous measuring device may thus operate autonomously without requiring to be connected to the aircraft's electrical system.

In order to make use of these data as part of a monitoring or maintenance process, it is necessary to be able to export these data outside the autonomous measuring device.

For this, the landing gear monitoring system 3 may also comprise an external terminal 4, to which the autonomous measuring device 2 may be connected via a communication interface 5 configured for transmitting to said external terminal 4 the measurements relating to the ageing of the landing gear stored in said storage memory 8. The exported data may be accompanied by identification data of the gear (P/N and S/N) to allow the tracking of a clearly identified gear. These identification data are stored in the monitoring system 3, for example, in the storage memory 8. In order to prevent any risk of electrical supply failure, the landing gear monitoring system 3 may also transmit an indicator of its power status, for example, a fill level of its battery.

The external terminal 4 may be a mobile terminal such as a tablet or a smartphone. It may be configured for retrieving the measurements relating to the ageing of the landing gear stored in the storage memory 8 of the autonomous measuring device 2 and for displaying these measurements on a display screen. The measurements relating to the ageing of the landing gear stored in said storage memory 8 may thus be transmitted, with the identification data of the landing gear where appropriate, to the external terminal 4 at the end of each flight once the flight is completed. Alternatively, communication between the external terminal and the measuring device may not be established at the end of each flight of the aircraft. The storage memory may then store measurements relating to the ageing of the landing gear corresponding to multiple flights of the aircraft, for example, since the last communication with the external terminal, and these data may be transferred in one go to the external terminal with the landing gear identification data where appropriate.

Such a communication interface may be a wired interface, such as an RS232 serial, USB, or Ethernet connection. Alternatively such a communication interface may be an active wireless link such as a WiFi, Bluetooth LE, UMTS/ 3G, LTE/4G or proprietary link adapted to the specific needs. When such an interface is of the wireless type, the autonomous measuring device may then comprise a radio frequency transceiver 9. Advantageously, the communication interface may be a passive wireless link of the RFID or NFC type not requiring the supply of any power by the measuring device itself. In order to limit the transmitting power of the transceiver 9 and therefore its power consumption compared with a WiFi or Bluetooth link, the communication interface may be a cellular network interface for connected objects of the "Sigfox" or "LoRa" type.

In one embodiment, the measuring device 2 may comprise a main unit comprising the processor 7, the storage memory 8, the transceiver 9, the power manager and the power source 11. The main unit may also comprise the sensors 6 intended to measure the general movements of the landing gear, such as gyroscopes and accelerometers, or to measure the parameters relating to the environment of the landing gear, such as temperature or atmospheric pressure sensors. Such a main unit may be a sealed unit made tight to protect it from extreme conditions (pressure, temperature, splashes of corrosive fluids, water splashes, etc.) that may be encountered during operations (storage, flight and parking).

Such a main unit may be connected to the sensors of the measuring device, known as remote sensors, needing to be positioned in particular locations remote from the installation location of the main unit, such as tire pressure sensors, shock strut travel sensors or even strain gages of the mechanical elements of the gear. Such a link may be a wired or wireless link of the same type as that used for communication with the external terminal. In case of using a wireless link, the main unit may employ its radio frequency transceiver 9 for communicating with the remote sensors. Furthermore these must have their own power source for supplying them with electricity, such as a battery. The main unit may thus communicate with the remote sensors without interfering with the aircraft's avionics network.

In particular, the main unit may communicate with such remote sensors through a UNB ("Ultra Narrow Band") network such as the "SigFox" or "LoRa" networks making it possible to minimize the power consumption of the communicating elements and to keep the power of electromagnetic emissions below the maximum limit set by the DO160 regulations section 21.

Communications between the main unit and the remote sensors of the measuring device, or between the measuring device and the external terminal may be secured, e.g. by being encrypted, in order to prevent these communications being understood and the information contained in the memory being overwritten by an unauthorized third party.

Having its own sensors, its own power source and its own communication interface, the measuring device may thus operate completely autonomously without any physical interface with the electrical network or the communication network of the aircraft. Such a device is thus simpler and subject to a limited number of certification requirements. Such a device only needs to be incorporated into an aircraft from a mechanical point of view and not from an electrical or computer point of view and may therefore be adapted to a wide variety of aircraft. The adaptation to a particular aircraft model may also comprise an adaptation of the parameters for detecting the various events detected in the method.

In order to ensure a fully autonomous operating period compatible with a use of the measuring device for measuring the ageing of a landing gear during multiple flights of the aircraft, the power consumption of the measuring device should be limited to what is strictly necessary. For this purpose, the operating status of the device may be managed by an implementation in three steps of the method described below. Such a method minimizes the power consumption of the device as much as possible according to the various flight phases of the aircraft. For this, the sampling frequency of the sensors comprised in the measuring device is adapted to each step of the method corresponding to one or more specific flight phases.

Figure 3:
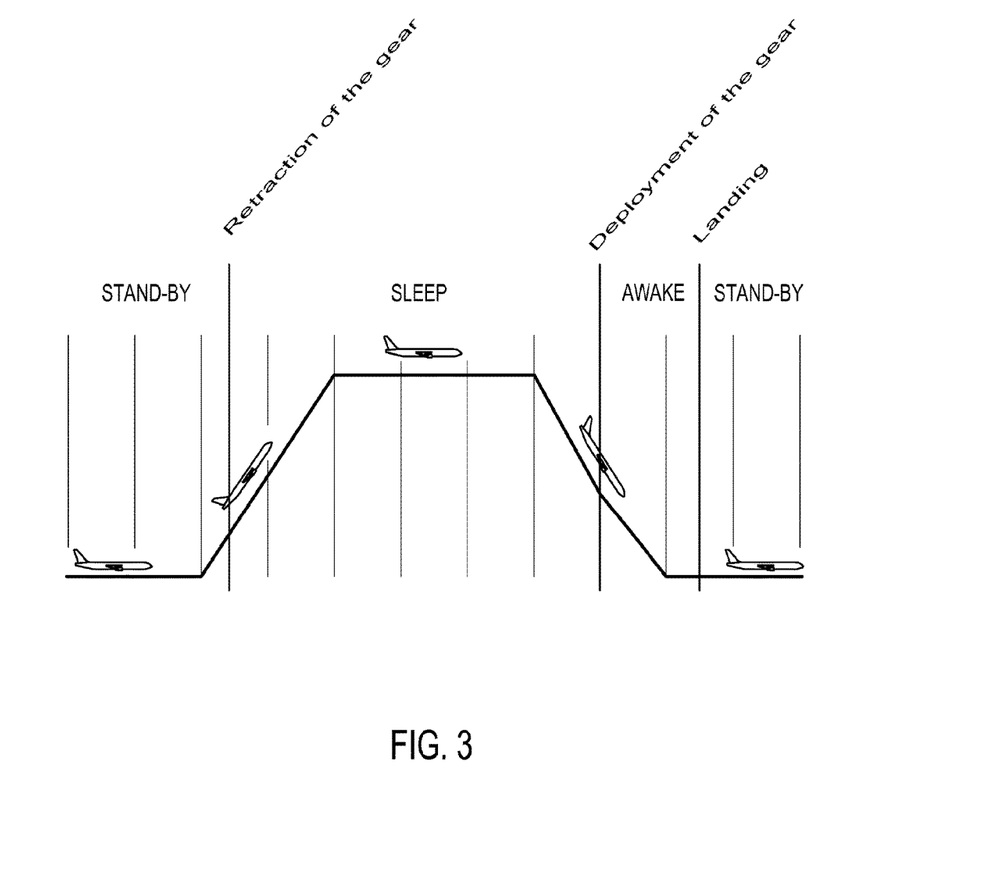
FIG. 3 schematically illustrates the various steps in the method for monitoring a landing gear according to an implementation of the invention.

The method may comprise a first "stand-by" step ("STAND-BY"). With reference to FIG. 3, this step starts at the end of a landing of the aircraft and covers the ground phase of the aircraft after its landing ("Ground"), including the phases of movement on the ground on the runways of an airport ("Taxi-in", "Taxi-out"), and the next take-off of the aircraft ("Take-off").

The method may comprise a second step known as a sleep step ("SLEEP"). This step corresponds to the flight phases of the aircraft in which the landing gear is retracted into a horizontal position, i.e. the climb ("Climb"), cruise ("Cruise") and descent ("Descent") phases until the aircraft passes into an approach phase.

The method may comprise a third "measuring" step ("AWAKE"). This step covers the approach phase ("Approach") when the landing gear is therefore extended in a vertical position and the landing phase itself ("Landing").

The required sampling frequency is different for each of these steps. The highest frequency is necessary during the measuring step ("AWAKE") since the flight phase corresponding to landing is that which calls upon the landing gears the most and therefore requires the most tracking. The flight phases of the other steps mainly require a measuring frequency sufficient for allowing the detection of a transition from one step to another and therefore allowing a much less frequent measurement acquisition.

The steps of the method are described in more detail in the following paragraphs, with reference to FIG. 4.

After a landing of the aircraft, the monitoring method may comprise a stand-by step ("STAND-BY") comprising detection with the aid of said sensors of the position of the landing gear at a first sampling frequency as long as the position of the landing gear is detected as vertical.

After detection of a horizontal position of the landing gear, the monitoring method may then comprise a sleep step ("SLEEP") comprising detection with the aid of said sensors of the position of the landing gear at least at a second sampling frequency, as long as the position of the landing gear is detected as horizontal.

After detection of a vertical position of the landing gear, the monitoring method may then comprise a measuring step ("AWAKE") comprising acquisition with the aid of said sensors of physical parameters relating to the ageing of the landing gear and detection of a landing of the aircraft at a third sampling frequency until a predetermined period has expired after a landing has been detected.

Finally, the monitoring method comprises a storage step ("STORAGE") in said storage memory 8 of measurements relating to the ageing of the landing gear according to said measured physical parameters.

In order to optimally manage the autonomy of operation of the measuring device, the third frequency is greater than the second frequencies, themselves greater than the first frequency. The physical parameters may thus be measured at a high frequency during the landing during the measuring step, then the measuring device operates at minimum frequency until take-off, and at an intermediate frequency during the flight of the aircraft so as not to miss the transition into the approach phase, the prelude to landing.

The detection during each of these steps of the position of the landing gear and/or a landing of the aircraft makes it possible to detect the instant of transition to the next step. Indeed:

the stand-by step ("STAND-BY") ends at the end of the take-off of the aircraft when the landing gear is retracted and therefore passed into a horizontal position, the sleep step ("SLEEP") ends at the end of the descent when the landing gear is extended and therefore passed into a vertical position, the "measuring" step ("AWAKE") ends at the end of the landing of the aircraft.

Figure 5A:
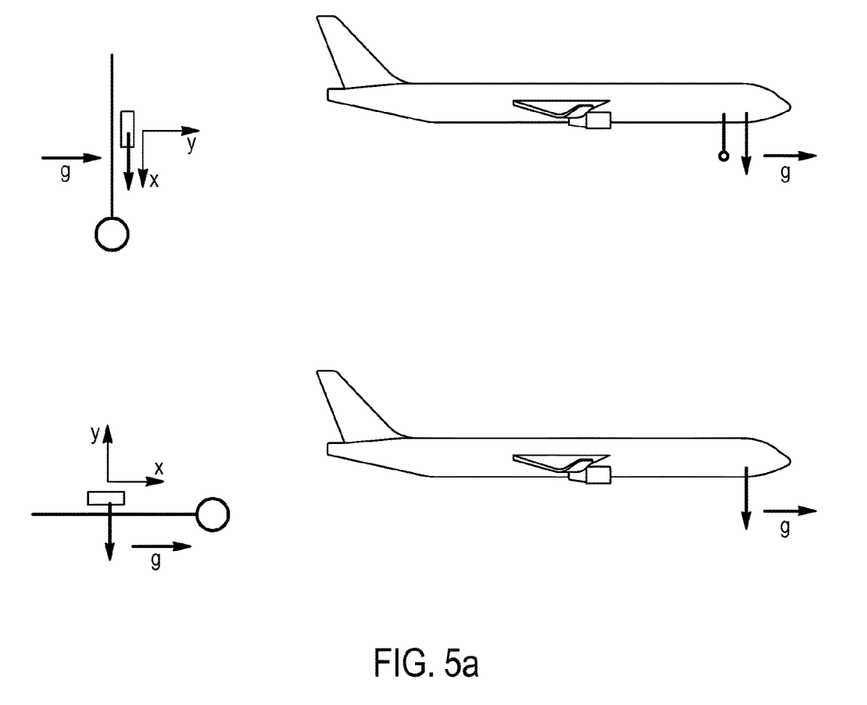
FIGS. 5a and 5b illustrate an implementation of detecting the position of a landing gear and/or a landing of the aircraft by sensors from measurements of the accelerations undergone by the landing gear.
Figure 5B:
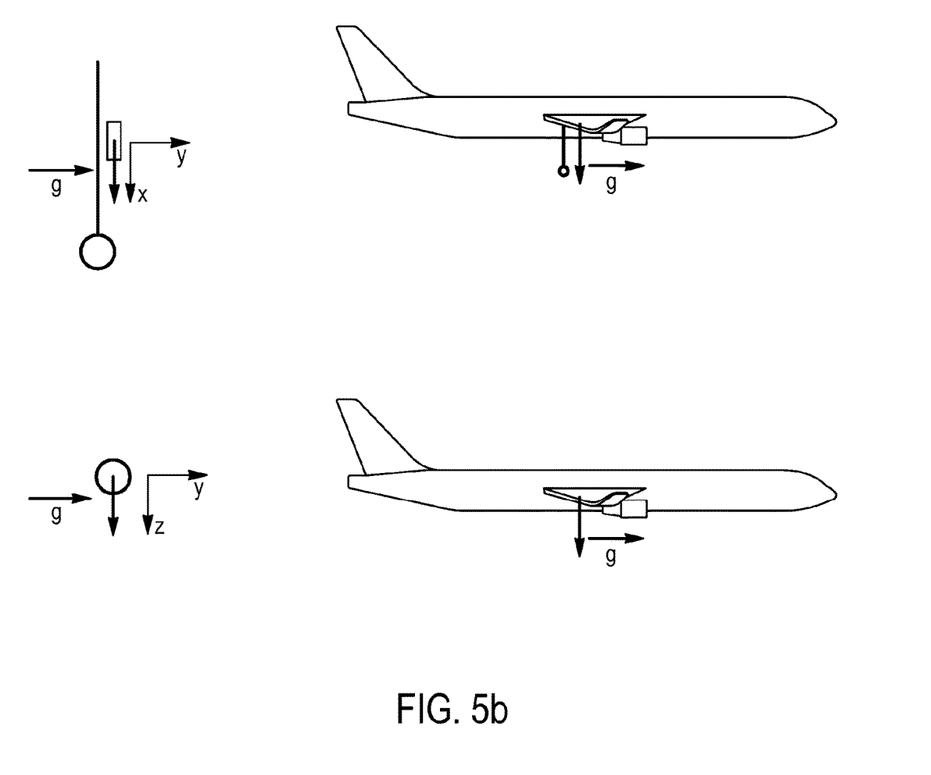

Such detection of the position of the landing gear and/or a landing of the aircraft may be implemented by the sensors 6 from measurements of the accelerations undergone by the landing gear. Indeed:

landing is characterized by a sudden variation in the vertical acceleration undergone by the gear on contact with the runway, when the landing gear is extended, therefore in the vertical position, an accelerometer positioned on the gear as represented in FIG. 5a will measure an acceleration due to gravity approximately equal to "+g", the universal gravitational constant, along the x-axis, when the landing gear is retracted, therefore in the horizontal position, an accelerometer thus positioned will measure an acceleration due to gravity approximately equal to "−g" along the y-axis in the case of a forward-retracting nose landing gear as represented in FIG. 5a, or equal to "+g" along the z-axis in the case of a side-retracting main landing gear as represented in FIG. 5b.

At the end of a flight, the end of the measuring step ("AWAKE") may involve the return of the method in a new stand-by step ("STAND-BY"). During a series of flights, the aircraft may thus cyclically implement the steps described above by implementing each of these three steps at least once on each flight.

Optionally, the measuring step ("AWAKE") may further comprise detection at the third sampling frequency of the position of the landing gear and the measuring step may be implemented until the detection of a horizontal position of the landing gear. It is possible indeed that the landing gear may be extended by mistake, or that the aircraft cannot in fact land as expected, thereby triggering the measuring step without this being immediately followed by a landing. The detection of a horizontal position of the landing gear then makes it possible to end this step when the landing gear is retracted without a landing having taken place.

The measuring step may also optionally comprise an estimate of the duration of implementation of said measuring step ("AWAKE"). The stand-by step ("STAND BY") is then implemented when the duration of implementation of the measuring step reaches a predetermined maximum duration ("TIMEOUT"). The landing gear is indeed ordinarily deployed only a few minutes before landing. A duration of executing the measuring step greater than such a maximum duration, e.g. 15 minutes, is then indicative of an erroneous triggering of the implementation of this step, or a lack of detection of landing although it has already taken place. The measuring step may then be interrupted in order to avoid an unnecessary waste of power resources of the device until the next landing.

The third sampling frequency may correspond to the operating frequency for observing vibrations, and in particular for observing different peaks of successive stresses (power peaks) or multiple successive vibration sequences (power sequences), during a landing. It may be by way of example in a range between 100 Hz and 1 kHz according to the frequency of the observed phenomena.

Typically, the ageing of the gear is calculated in the following way:

For each landing, the shock felt in g (X, Y and Z) is measured on each axis, for multiple bounces, i.e. multiple successive peaks of the stress curve, typically up to 5 (the term "bounce" must be understood here in the broad sense and includes the first landing shock (first power peak) which constitutes bounce #1, the other bounces). The shock measured by the sensor is obtained by accelerometer measurement sequences filtered through a filter (e.g. a Butterworth filter) for quantifying these shocks.

The service life of the gear will thus be measured as summarized in the following table:

| Landing #1 | Landing #X | Landing #Y |
|---|---|---|
| $X_1$ $X_2$ $X_3$ $X_4$ $X_5$ | ... | $X_1$ $X_2$ $X_3$ $X_4$ $X_5$ |
| $Y_1$ $Y_2$ $Y_3$ $Y_4$ $Y_5$ | ... | $Y_1$ $Y_2$ $Y_3$ $Y_4$ $Y_5$ |
| $Z_1$ $Z_2$ $Z_3$ $Z_4$ $Z_5$ | ... | $Z_1$ $Z_2$ $Z_3$ $Z_4$ $Z_5$ | where the values X1, X2 ... XR, Y1, Y2 ... YR and Z1, Z2 ... ZR correspond to the values in g measured on the three axes, R being between 1 and 5.

Furthermore, a correspondence table is defined between the intensity of shocks felt (absolute value) and a number of "ageing cycles", illustrated by the table below:

| Shock felt for X (in g) | Corresponding number of cycles |
|---|---|
| Absolute shock value above Threshold$_{Max\ X}$ | Max$_{Cycles\ X}$ (maintenance mandatory) |
| Absolute shock value between Threshold$_{S10\ X}$ and Threshold$_{Max\ X}$ | $X_{10}$ cycles |
| Absolute shock value between Threshold$_{S9\ X}$ and Threshold$_{S10\ X}$ | $X_9$ cycles |
| Absolute shock value between Threshold$_{S8\ X}$ and Threshold$_{S9\ X}$ | $X_8$ cycles |
| Absolute shock value between Threshold$_{S7\ X}$ and Threshold$_{S8\ X}$ | $X_7$ cycles |
| Absolute shock value between Threshold$_{S6\ X}$ and Threshold$_{S7\ X}$ | $X_6$ cycles |
| ... | ... |
| Absolute shock value between Threshold$_{S0\ X}$ and Threshold$_{S1\ X}$ | $X_0$ cycles |

Thus, each shock felt increments the number of cycles undergone by the equipment.

This tracking is conducted on each axis X, Y and Z.

The maintenance policy may thus be based on this "number of cycles" indicator: for example, the total cycles for each landing and each bounce is summed for each axis; when the number of cycles reaches a given threshold for the axis in question (Max$_{Cycles\ (X,\ Y\ or\ Z)}$), an alert is triggered by the system, indicating that the gear requires maintenance. Multiple second frequencies below the third frequency may be employed at different instants of the sleep step ("SLEEP"). For example, the sampling frequency employed during this step may be minimized when a constant flight altitude is measured. Landing is then not actually imminent and a second lower frequency than that having to be employed during the aircraft's descent may be used in order not to miss the opening of the gear. A second frequency may be, for example, in a range between 1 second and 60 seconds. The opening of the gear during the descent is then detected with a potential delay much less than the period between the opening of the gear and landing, generally of the order of a few minutes. The sampling of the landing at the third sampling frequency is thus ensured, while minimizing the consumption of the device, kept in a low consumption state during the major part of the aircraft's flight.

The measurements taken during the stand-by step ("STAND-BY") are only intended to monitor the passage of the landing gear from the vertical to the horizontal position. A first low sampling frequency may be employed since the horizontal position of the landing gear is maintained in the major part of the aircraft's flight, on average for a duration of at least 2 hours. The first frequency may be, for example, in a range between 10 and 30 minutes. The device is thus maintained in a state of very low consumption for the major part of taxiing on the ground and a part of the aircraft's flight.

Figure 4:
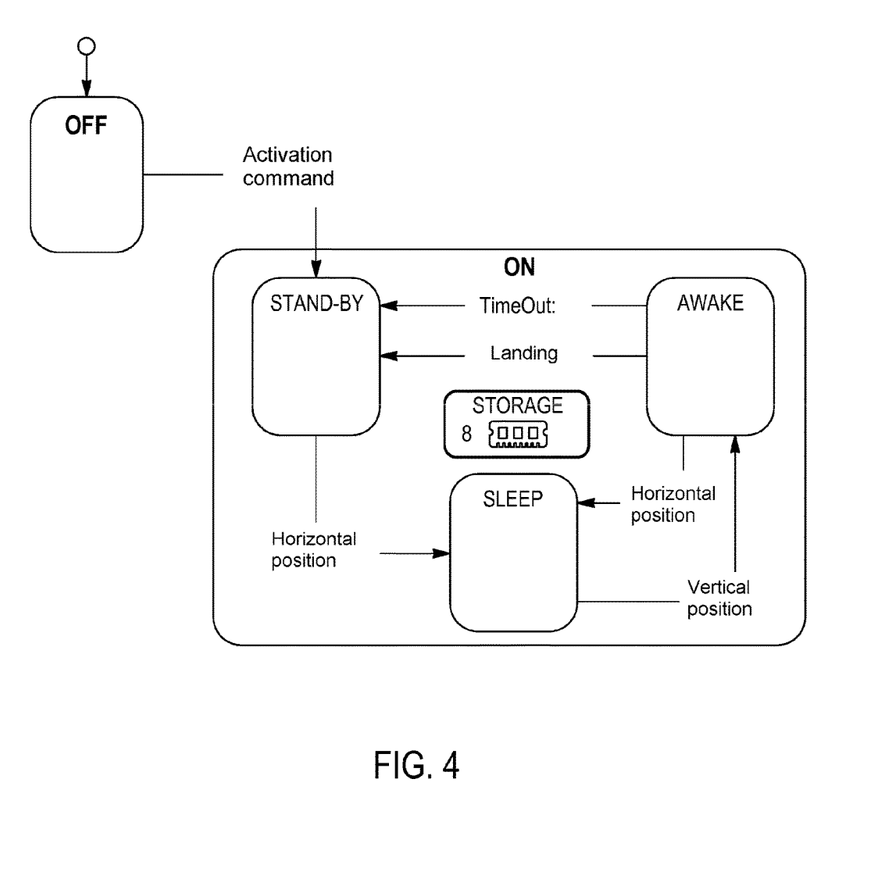
FIG. 4 is a simplified diagram of an example of implementation of the method for monitoring a landing gear according to the invention.

As represented in FIG. 4, the stand-by, sleep and measuring steps may be combined within an active operating phase ("ON") during which the device performs the steps described above in order to detect and sample the successive landings of the aircraft on which it is installed.

Prior to such an operating phase, the device may be in a storage phase during which it is not operational. In the case of a device comprising a tightly sealed unit, it may not comprise a start-up switch, in order to avoid any external mechanical interface, and must then be powered at the end of its manufacture just before being sealed. The monitoring method may then further comprise a hibernation step ("OFF") during which the device detects the reception of an activation command at a fourth sampling frequency less than said first frequency. The stand-by step ("STAND-BY") is then implemented following the detection of said command. The device may thus check at regular intervals whether it has received such an activation command from an external device such as the external terminal 4, for example, by checking whether a value in memory has been modified by such an external device. The fourth sampling frequency may be very low so as to minimize the power consumption during this hibernation step and to allow the storage of the device for several years before an operational use without depleting its battery.

In the case of a measuring device comprising a main unit and remote sensors, the main unit may transmit to the remote sensors, according to the flight phases, commands for modifying their operating state for minimizing the electrical consumption and optimizing the service life of these sensors.

Once the measurements relating to the ageing of the landing gear are stored in its storage memory 8, the autonomous device 2 may transmit them with the identification data of the landing gear where appropriate, to the external terminal 4 via its communication interface 5. This transmission makes it possible to download an aircraft's maintenance information very speedily without human intervention.

Such a transmission may be allowed only during the stand-by step ("STAND-BY") so as to prevent access, necessarily fraudulent, to the measurements during other steps of the process. To do this, the communication interface 5 of the autonomous measuring device 2 may only be activated during this stand-by step ("STAND BY").

Alternatively, sending a specific datum (low in volume) may be performed in flight, e.g. in the case of transmitting an alert datum that cannot wait for the next stand-by step to be transmitted.

The method provided thus makes it possible to monitor the ageing of the landing gear of an aircraft in detail, without any connection to the aircraft's avionics system. The fine management of the power consumption of the device provided makes it possible to implement this method continuously over a long period without needing a power source other than that incorporated in the device itself.

The invention claimed is:

1. A method for monitoring the aging of a landing gear of an aircraft implemented by an autonomous measuring device mounted on said landing gear, said autonomous measuring device including:
   at least one sensor configured for measuring physical parameters relating to the aging of the landing gear and at least one sensor configured for detecting the position of the landing gear and the landing of the aircraft,
   a storage memory for storing measurements relating to the aging of the landing gear according to said measured physical parameters, said monitoring method comprising the following steps:
   after a landing of the aircraft, a stand-by step ("STAND-BY") comprising detecting with the aid of said sensors the position of the landing gear at a first sampling frequency as long as the position of the landing gear is detected as vertical,
   after detection of a horizontal position of the landing gear, a sleeping step ("SLEEP") comprising detecting with the aid of said sensors of the position of the landing gear at least at a second sampling frequency, as long as the position of the landing gear is detected as horizontal,
   after detection of a vertical position of the landing gear, a measuring step ("AWAKE") comprising acquiring with the aid of said sensors physical parameters relating to the aging of the landing gear and detection of a landing of the aircraft until a predetermined period has expired after a landing has been detected,
   said monitoring method further comprising storing ("STORAGE") in said storage memory of measurements relating to the aging of the landing gear according to said measured physical parameters,
   wherein
   the sensors comprise accelerometers capable of measuring the linear accelerations of the landing gear along three axes in three orthogonal directions,
   wherein during the measuring step (AWAKE), the steps acquiring and detecting are implemented at a third sampling frequency,
   said third sampling frequency being greater than the second sampling frequency, said second sampling frequency being greater than said first sampling frequency,
   said third frequency being adapted to a measurement, by the accelerometers, of the intensity of successive shocks during a landing, a shock felt being measured in three axes by the accelerometers for multiple successive bounces including the first shock of landing, the accelerometer measurement sequences being filtered through a filter for quantifying these shocks, giving a shock value per axis in g for each measured bounce,
   the intensities thus measured being converted into a number of aging cycles, by a correspondence table,
   each shock felt incrementing the number of aging cycles undergone by the equipment,
   the total cycles being summed for each axis,
   and wherein when the summed total cycles reaches a given threshold for an axis (MaxCycles (X, Y or Z)), an alert is triggered.

2. The method according to claim 1, wherein the measuring step ("AWAKE") further comprises a step of detecting at the third sampling frequency of the position of the landing gear and wherein said measuring step is implemented until the detection of a horizontal position of the landing gear.

3. The method according to claim 2, wherein the physical parameters relating to the aging of the landing gear comprise the static and dynamic strains of structural parts of the aircraft, the accelerations of components of the landing gear, the pressures and temperatures of the aircraft's tires, the pressures and temperatures of the aircraft's shock struts, the travel of the aircraft's shock strut.

4. The method according to claim 1, wherein said sensors detect the position of the landing gear and the landing of the aircraft from measurements of the accelerations undergone by the landing gear.

5. The method according to claim 1 further comprising a hibernation step ("OFF") during which the device detects the reception of an activation command at a fourth sampling frequency less than said first frequency and wherein the stand-by step is implemented following the detection of said command.

6. The method according to claim 1, wherein said measuring device further comprises a communication interface, and comprising a step of transmitting said measurements relating to the aging of the landing gear stored in said storage memory to an external terminal.

7. The method according to claim 6, wherein said measuring device transmits said measurements relating to the aging of the landing gear only during the stand-by step.

8. A non-transitory computer readable storage medium storing computer program code which, when executed by a processor, causes the processor to perform a method comprising the following steps:
after a landing of the aircraft, a stand-by step ("STAND-BY") comprising detecting with the aid of at least one sensor comprising accelerometers capable of measuring the linear acceleration of the landing gear along three axes in three orthogonal directions, a position of a landing gear at a first sampling frequency as long as the position of the landing gear is detected as vertical,
after detection of a horizontal position of the landing gear, a sleeping step ("SLEEP") comprising detecting with the aid of the at least one sensor the position of the landing gear at least at a second sampling frequency, as long as the position of the landing gear is detected as horizontal,
after detection of a vertical position of the landing gear, a measuring step ("AWAKE") comprising acquiring with the aid of the at least one sensor physical parameters relating to the aging of the landing gear and detecting a landing of the aircraft until a predetermined period has expired after the landing has been detected,
a storing step of storing ("STORAGE") in a storage memory measurements relating to the aging of the landing gear according to said measured physical parameters,
wherein
during the measuring step (AWAKE), the steps acquiring and detecting are implemented at a third sampling frequency, the third sampling frequency being greater than the second sampling frequency, and the second sampling frequency being greater than the first sampling frequency,
the third frequency being adapted to a measurement, by the accelerometers, of the intensity of successive shocks during a landing, a shock felt being measured in three axes by the accelerometers for multiple successive bounces including the first shock of landing, the accelerometer measurement sequences being filtered through a filter for quantifying the shocks, giving a shock value per axis in g for each measured bounce,
the intensities thus measured being converted into a number of aging cycles, by a correspondence table,
each shock felt incrementing the number of aging cycles undergone by the equipment, the total cycles being summed for each axis,
and wherein when the summed total cycles reaches a given threshold for an axis (MaxCycles (X, Y or Z)), an alert is triggered.

9. An autonomous measuring device configured for being mounted on a landing gear, the autonomous measuring device comprising:
at least one sensor configured for measuring physical parameters relating to the aging of the landing gear and at least one sensor configured for detecting the position of the landing gear and the landing of the aircraft,
a storage memory for storing measurements relating to the aging of the landing gear according to said measured physical parameters,
said comprising accelerometers capable of measuring the linear accelerations of the landing gear along three axes in three orthogonal directions and being configured, once mounted on the landing gear, for implementing said steps of a monitoring method comprising the following steps:
after a landing of the aircraft, a stand-by step ("STAND-BY") comprising detecting with the aid of said sensors the position of the landing gear at a first sampling frequency as long as the position of the landing gear is detected as vertical,
after detection of a horizontal position of the landing gear, a sleeping step ("SLEEP") comprising detecting with the aid of said sensors of the position of the landing gear at least at a second sampling frequency, as long as the position of the landing gear is detected as horizontal,
after detection of a vertical position of the landing gear, a measuring step ("AWAKE") comprising acquiring with the aid of said sensors physical parameters relating to the aging of the landing gear and detecting a landing of the aircraft until a predetermined period has expired after a landing has been detected,
said monitoring method further comprising storing ("STORAGE") in said storage memory measurements relating to the aging of the landing gear according to said measured physical parameters,
wherein
the sensors comprise accelerometers capable of measuring the linear accelerations of the landing gear along three axes in three orthogonal directions,
wherein during the measuring step (AWAKE), the steps acquiring and detecting are implemented at a third sampling frequency,
said third sampling frequency being greater than the second sampling frequency, said second sampling frequency being greater than said first sampling frequency,
said third frequency being adapted to a measurement, by the accelerometers, of the intensity of successive shocks during a landing, a shock felt being measured in three axes by the accelerometers for multiple successive bounces including the first shock of landing, the accelerometer measurement sequences being filtered through a filter for quantifying these shocks, giving a shock value per axis in g for each measured bounce,
the intensities thus measured being converted into a number of aging cycles, by a correspondence table,
each shock felt incrementing the number of aging cycles undergone by the equipment, the total cycles being summed for each axis,
and wherein when the summed total cycles reaches a given threshold for an axis (MaxCycles (X, Y or Z)), an alert is triggered.

10. The device according to claim 9, comprising a power source for electrically powering its components and a power manager capable of managing the modes of electrical consumption of said components.

11. A monitoring system comprising:
an external terminal; and
an autonomous measuring device configured for being mounted on a landing gear, the autonomous measuring device comprising:
at least one sensor configured for measuring physical parameters relating to the aging of the landing gear and at least one sensor configured for detecting the position of the landing gear and the landing of the aircraft,
a storage memory for storing measurements relating to the aging of the landing gear according to said measured physical parameters,
said sensors comprising accelerometers capable of measuring the linear accelerations of the landing gear along three axes in three orthogonal directions and being configured, once mounted on the landing gear, for implementing said steps of a monitoring method comprising the following steps:
after a landing of the aircraft, a stand-by step ("STAND-BY") comprising detecting with the aid of said sensors the position of the landing gear at a first sampling frequency as long as the position of the landing gear is detected as vertical,
after detection of a horizontal position of the landing gear, a sleeping step ("SLEEP") comprising detecting with the aid of said sensors of the position of the landing gear at least at a second sampling frequency, as long as the position of the landing gear is detected as horizontal,
after detection of a vertical position of the landing gear, a measuring step ("AWAKE") comprising acquiring with the aid of said sensors physical parameters relating to the aging of the landing gear and detecting a landing of the aircraft until a predetermined period has expired after a landing has been detected,
said monitoring method further comprising storing ("STORAGE") in said storage memory measurements relating to the aging of the landing gear according to said measured physical parameters,
wherein
the sensors comprise accelerometers capable of measuring the linear accelerations of the landing gear along three axes in three orthogonal directions,
wherein during the measuring step (AWAKE), the steps acquiring and detecting are implemented at a third sampling frequency,
said third sampling frequency being greater than the second sampling frequency, said second sampling frequency being greater than said first sampling frequency,
said third frequency being adapted to a measurement, by the accelerometers, of the intensity of successive shocks during a landing, a shock felt being measured in three axes by the accelerometers for multiple successive bounces including the first shock of landing, the accelerometer measurement sequences being filtered through a filter for quantifying these shocks, giving a shock value per axis in g for each measured bounce,
the intensities thus measured being converted into a number of aging cycles, by a correspondence table,
each shock felt incrementing the number of aging cycles undergone by the equipment,
the total cycles being summed for each axis,
and wherein when the summed total cycles reaches a given threshold for an axis (MaxCycles (X, Y or Z)), an alert is triggered, and
wherein said autonomous measuring device further comprises a communication interface configured for transmitting to said external terminal the measurements relating to the aging of the landing gear stored in said storage memory.

12. The system according to claim 11, wherein the communication interface is activated only during the stand-by step ("STAND-BY").

13. The system according to claim 12, wherein the communication interface is an RFID, NFC interface or a cellular network interface for connected objects.

* * * * *